(12) United States Patent
Gochenour et al.

(10) Patent No.: US 9,563,069 B2
(45) Date of Patent: Feb. 7, 2017

(54) WEARABLE EYEGLASSES WITH SECURING TEMPLES

(71) Applicant: Eyeboas, LLC, Grandview, MO (US)

(72) Inventors: James W. Gochenour, Lee's Summit, MO (US); Brett A. Schmitt, Shawnee, KS (US)

(*) Notice: Subject to any disclaimer, the term of this patent is extended or adjusted under 35 U.S.C. 154(b) by 0 days.

(21) Appl. No.: 15/163,593

(22) Filed: May 24, 2016

(65) Prior Publication Data
US 2016/0266402 A1   Sep. 15, 2016

Related U.S. Application Data

(63) Continuation-in-part of application No. 29/486,378, filed on Mar. 28, 2014, now Pat. No. Des. 757,153.

(51) Int. Cl.
| | |
|---|---|
| G02C 5/16 | (2006.01) |
| G02C 3/00 | (2006.01) |
| G02C 5/22 | (2006.01) |
| G02C 5/06 | (2006.01) |
| G02C 5/12 | (2006.01) |
| G02C 5/00 | (2006.01) |

(52) U.S. Cl.
CPC ............ *G02C 3/003* (2013.01); *G02C 5/008* (2013.01); *G02C 5/06* (2013.01); *G02C 5/12* (2013.01); *G02C 5/16* (2013.01); *G02C 5/2254* (2013.01); *G02C 2200/12* (2013.01); *G02C 2200/22* (2013.01)

(58) Field of Classification Search
CPC .......... G02C 3/003; G02C 5/008; G02C 5/14; G02C 5/143; G02C 5/146; G02C 5/16; G02C 5/18; G02C 5/22; G02C 5/2218; G02C 5/2254; G02C 2200/22
USPC .................. 351/111, 113, 114, 153
See application file for complete search history.

(56) References Cited

U.S. PATENT DOCUMENTS

| | | | |
|---|---|---|---|
| 2,323,518 A | 7/1943 | Cochran | |
| 2,975,426 A * | 3/1961 | Rabb | G02C 5/006 2/13 |
| 4,908,878 A | 3/1990 | Tarragano | |
| 5,153,619 A | 10/1992 | Nix | |
| 5,435,006 A | 7/1995 | Kitayama | |
| 5,559,632 A | 9/1996 | Lawrence et al. | |
| 5,614,963 A | 3/1997 | Parker | |
| 5,886,771 A | 3/1999 | Osgood | |
| D410,021 S | 5/1999 | Heyman et al. | |
| 5,938,014 A | 8/1999 | Wilkinson | |

(Continued)

OTHER PUBLICATIONS

Eyelet: Bracelet Sunglasses Hybrid Facebook Page, https://www.facebook.com/Eyelet.Bracelet.Sunglasses, Accessed Sep. 10, 2013.

(Continued)

*Primary Examiner* — Huy K Mai
(74) *Attorney, Agent, or Firm* — Law Office of Mark Brown, LLC; Christopher M. DeBacker; Mark E. Brown

(57) ABSTRACT

A pair of eyeglasses with securing temples having snap-steel interiors. These temples comfortably wrap partially about a user's head, thereby securing the eyeglasses to the user's head. The snap steel transforms the temples from a first, rigid position where the glasses can be easily stored and transported to a second, wrapped position where the temples wrap about and contour to a user's head. The temples and the frame are manufactured from the same piece of material.

6 Claims, 20 Drawing Sheets

(56) References Cited

U.S. PATENT DOCUMENTS

| | | | |
|---|---|---|---|
| 6,902,272 | B2 | 6/2005 | Woford |
| 7,011,405 | B2 | 3/2006 | Chen |
| D547,789 | S | 7/2007 | Eaton |
| D586,377 | S | 2/2009 | Robles |
| 7,748,843 | B2 | 7/2010 | Stewart |
| 8,070,288 | B2 | 12/2011 | Heyman et al. |
| D662,965 | S | 7/2012 | Carlow et al. |
| 2012/0038877 | A1 | 2/2012 | Burns et al. |
| 2014/0375947 | A1* | 12/2014 | Park .................. G02C 5/16 |
| | | | 351/113 |

OTHER PUBLICATIONS

Eyelet: Bracelet Sunglasses Hybrid Indiegogo Page, https://www.indiegogo.com/projects/eyelet-bracelet-sunglasses-hybrid, Accessed Sep. 10, 2013.

* cited by examiner

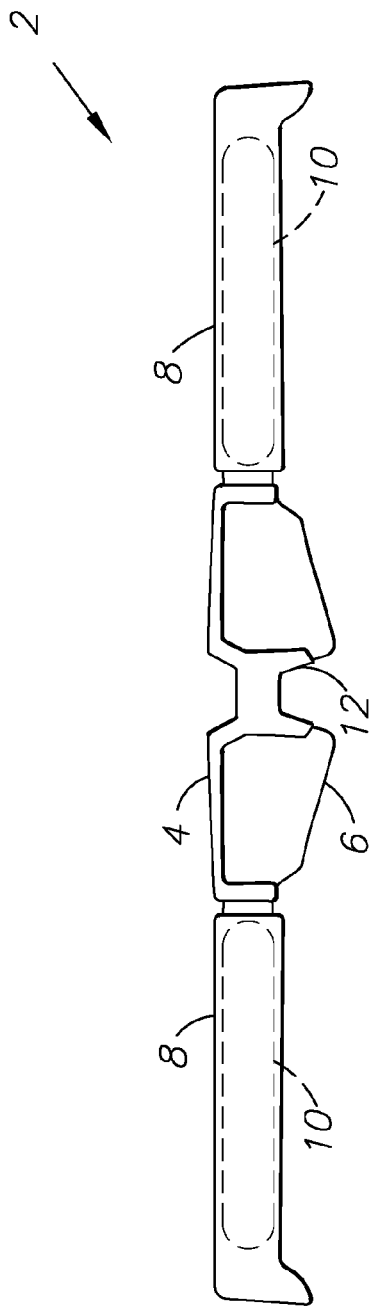
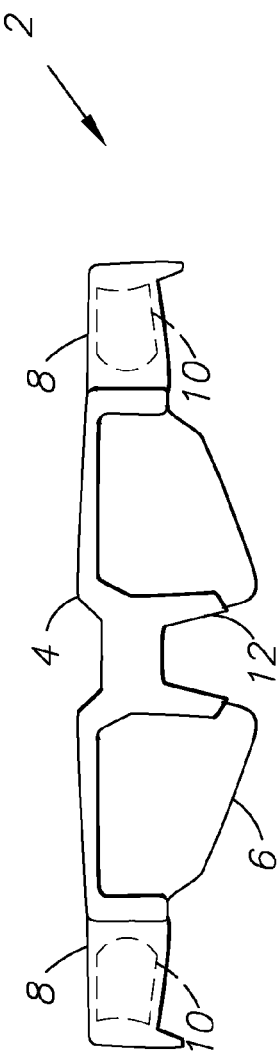

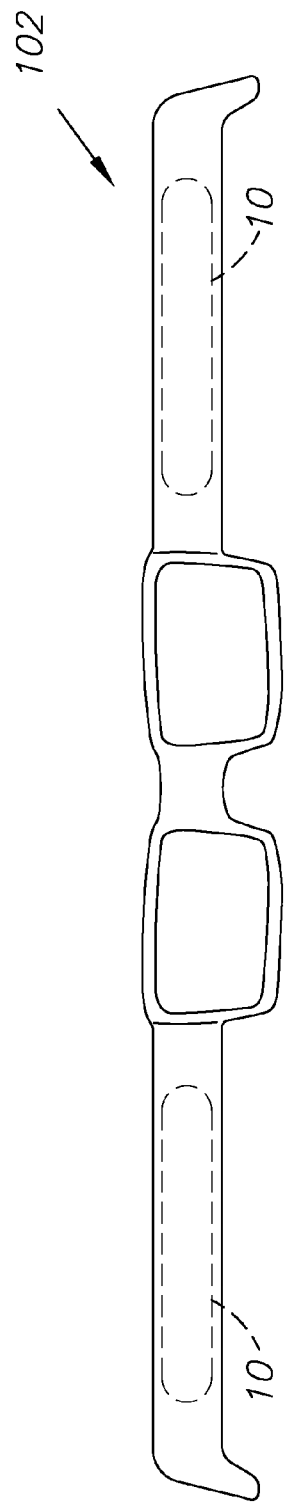
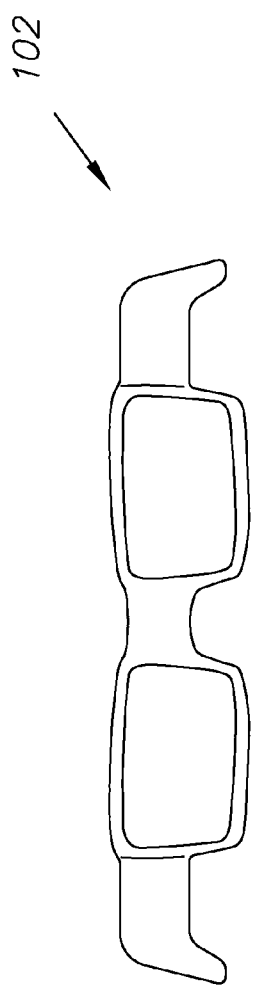
FIG. 9
FIG. 10

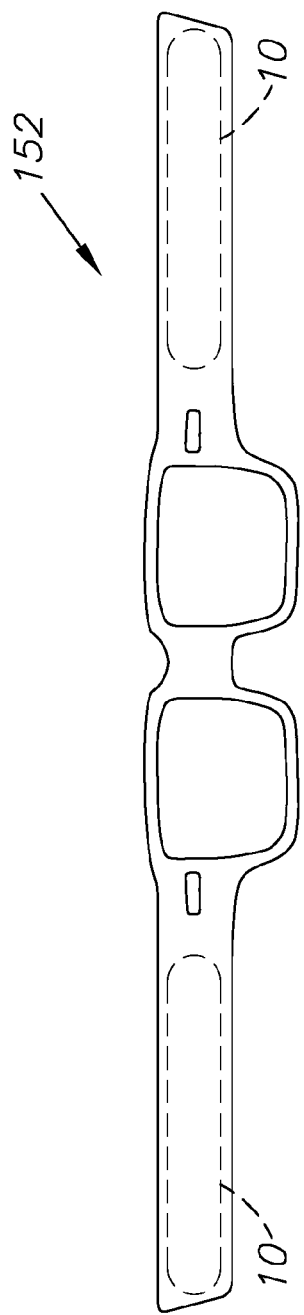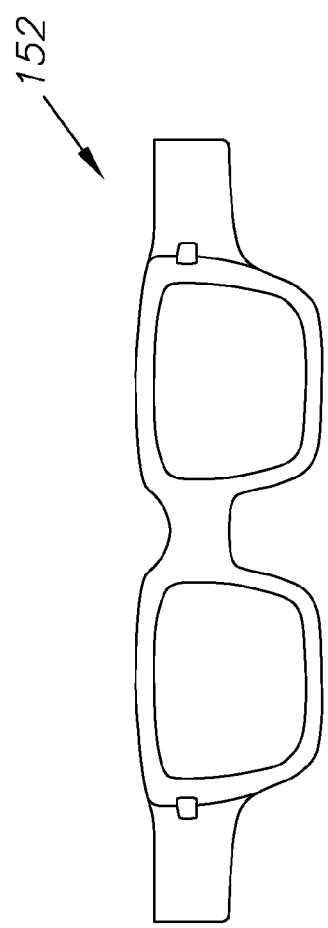

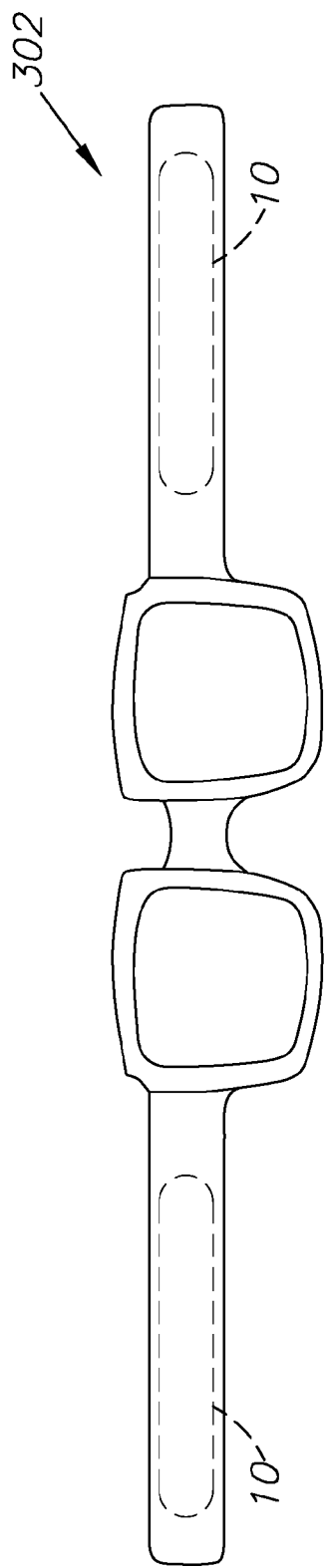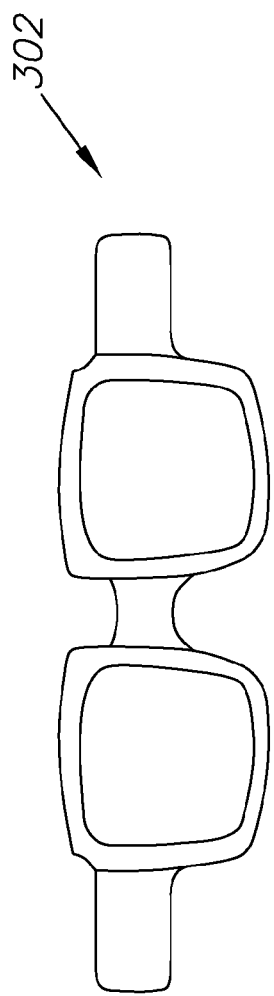

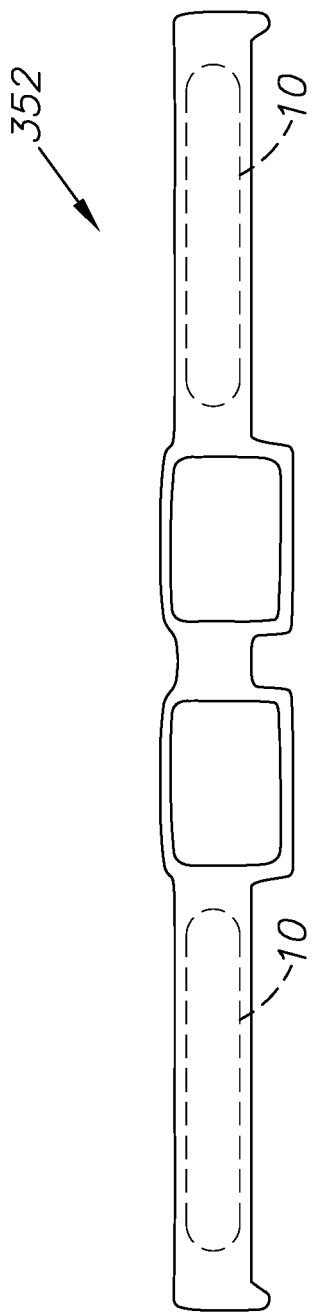
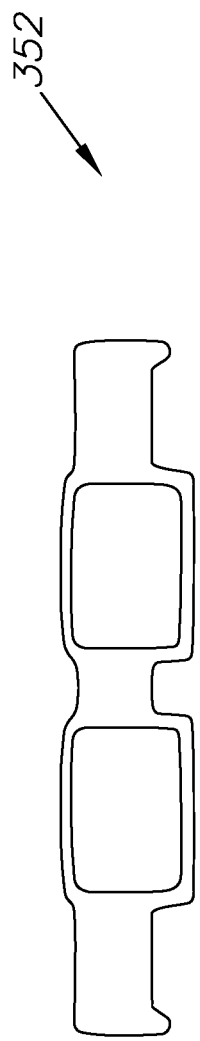
FIG. 29
FIG. 30

US 9,563,069 B2

WEARABLE EYEGLASSES WITH SECURING TEMPLES

CROSS-REFERENCE TO RELATED APPLICATION

This application claims priority in U.S. Design patent application No. 29/486,378, filed Mar. 28, 2014, now U.S. Design Pat. No. D757,153, issued May 24, 2016, which is incorporated herein by reference.

BACKGROUND OF THE INVENTION

1. Field of the Invention

The present invention relates generally to wearable eyeglasses and method for use thereof, and more specifically to wearable eyeglasses with securing temples including snap-steel interiors.

2. Description of the Related Art

Existing reading glasses, sunglasses, and fashion glasses rely on centuries-old technology of straight, rigid temples for securing the glasses to a wearer's head. Improvements have been made where the temples can be secured further by using a band or a strap which connects to the ends of the temples and wraps around the user's head, but these are cumbersome, tacky, and require additional purposes. What is needed is a simple, compact pair of eyeglasses which include securing temples.

Heretofore there has not been available a system or method for eyeglasses with the advantages and features of the present invention.

BRIEF SUMMARY OF THE INVENTION

The present invention generally provides a pair of eyeglasses with securing temples having snap-steel interiors. These temples comfortably wrap partially about a user's head, thereby securing the eyeglasses to the user's head. The snap steel transforms the temples from a first, rigid position where the glasses can be easily stored and transported to a second, wrapped position where the temples wrap about and contour to a user's head. The temples and the frame are manufactured from the same piece of material.

BRIEF DESCRIPTION OF THE DRAWINGS

The drawings constitute a part of this specification and include exemplary embodiments of the present invention illustrating various objects and features thereof.

FIG. 1 is a front elevational view of an embodiment of the present invention in an unwrapped position, the embodiment including utility/safety/sporting glasses design.

FIG. 2 is a front elevational view thereof in a wrapped position.

FIG. 9 is a front elevational view of a third embodiment of the present invention in an unwrapped position, the embodiment including men's reading glasses design.

FIG. 10 is a front elevational view thereof in a wrapped position.

13 is a front elevational view of a fourth embodiment of the present invention in an unwrapped position, the embodiment including unisex glasses design.

FIG. 14 is a front elevational view thereof in a wrapped position.

Figure 3:
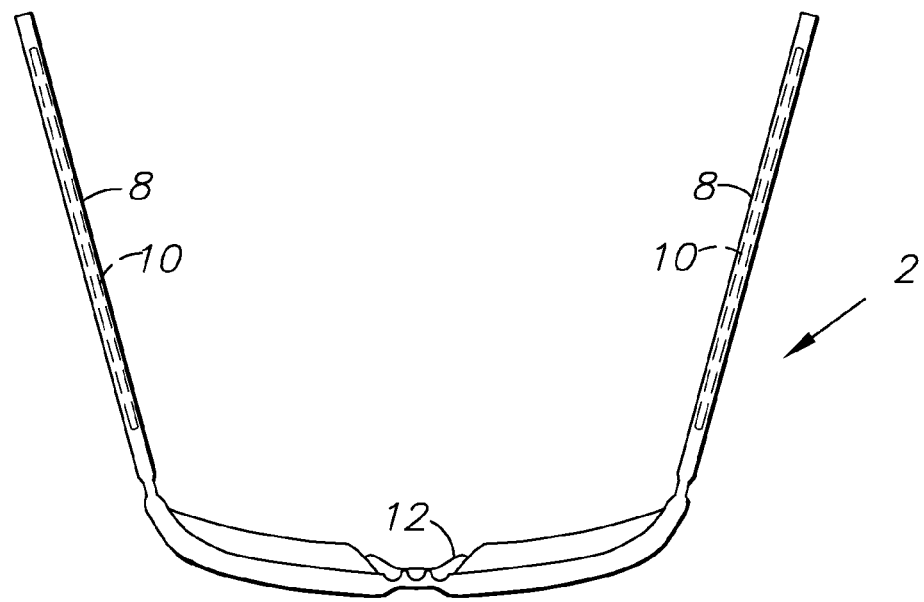
FIG. 3 is a top plan view thereof.
Figure 4:
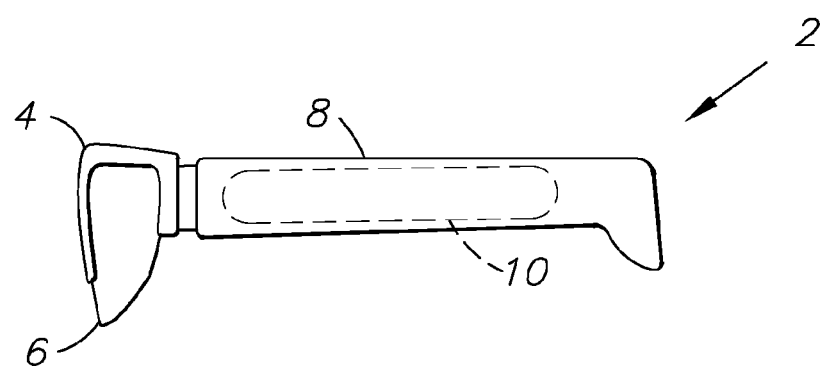
FIG. 4 is a side elevational view thereof.
Figure 5:
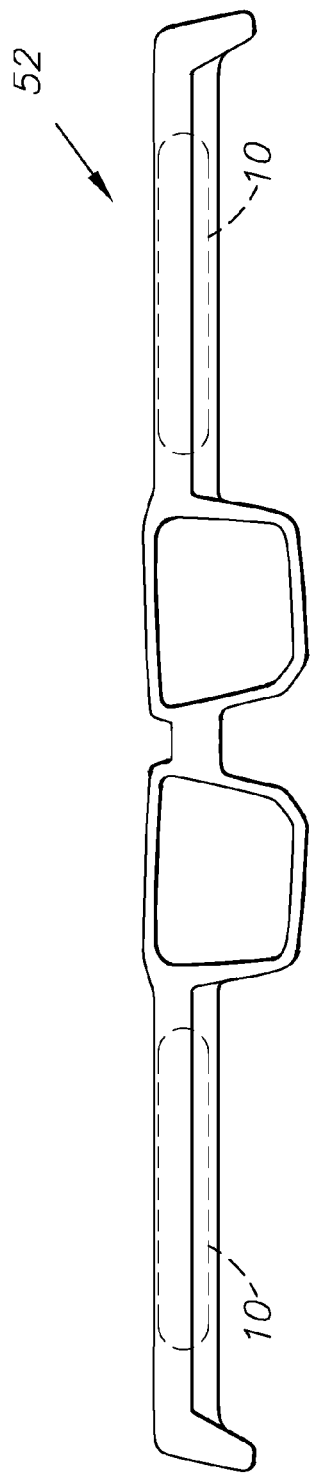
FIG. 5 is a front elevational view of a second embodiment of the present invention in an unwrapped position, the embodiment including men's fashion glasses design.
Figure 6:
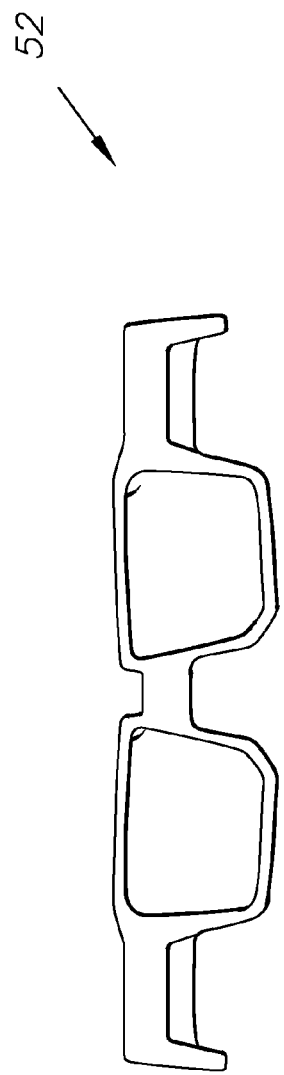
FIG. 6 is a front elevational view thereof in a wrapped position.
Figure 7:
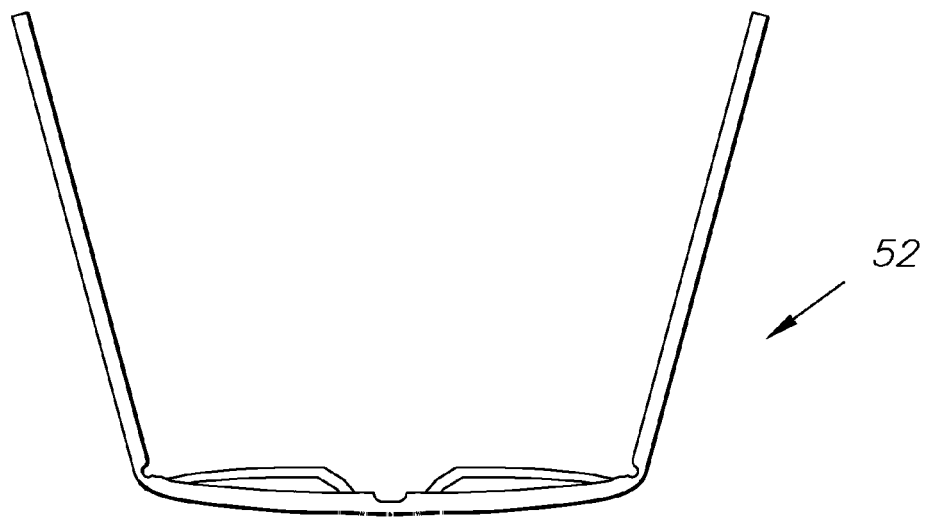
FIG. 7 is a top plan view thereof.
Figure 8:
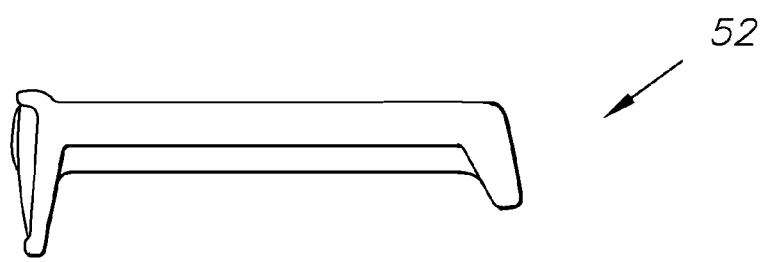
FIG. 8 is a side elevational view thereof.
Figure 11:
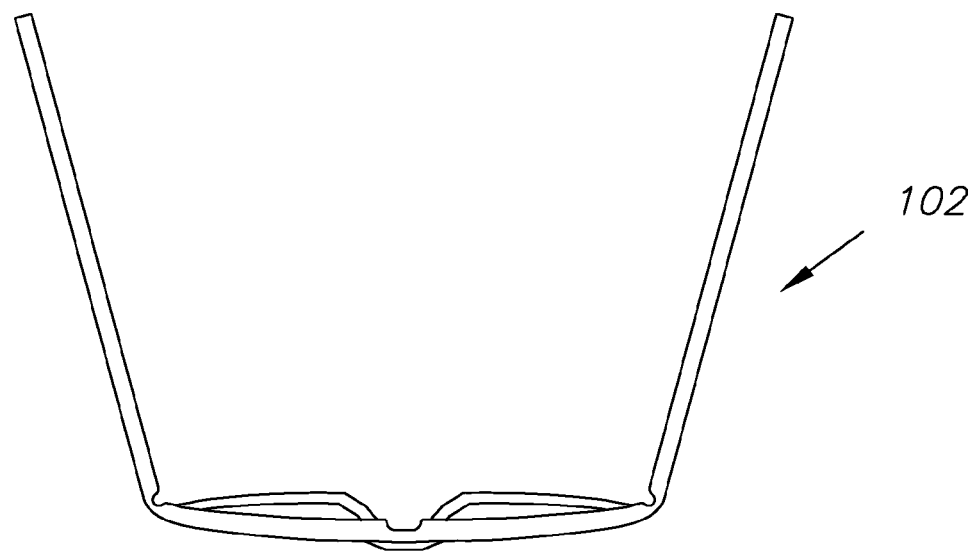
FIG. 11 is a top plan view thereof.
Figure 12:
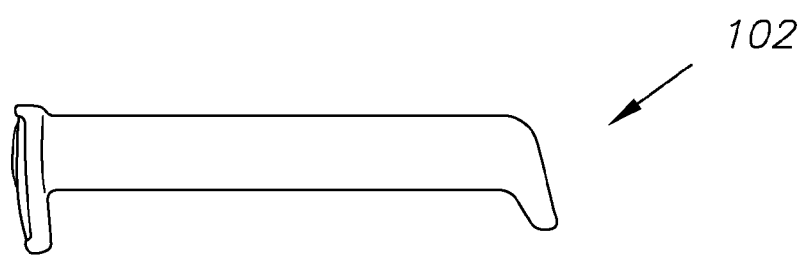
FIG. 12 is a side elevational view thereof.
Figure 15:
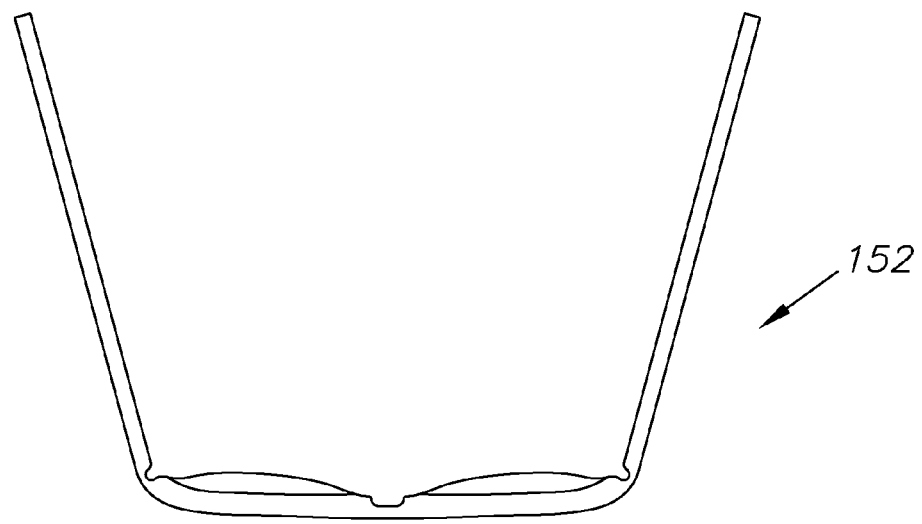

FIG. 15 is a top plan view thereof.

Figure 16:

FIG. 16 is a side elevational view thereof.

Figure 17:
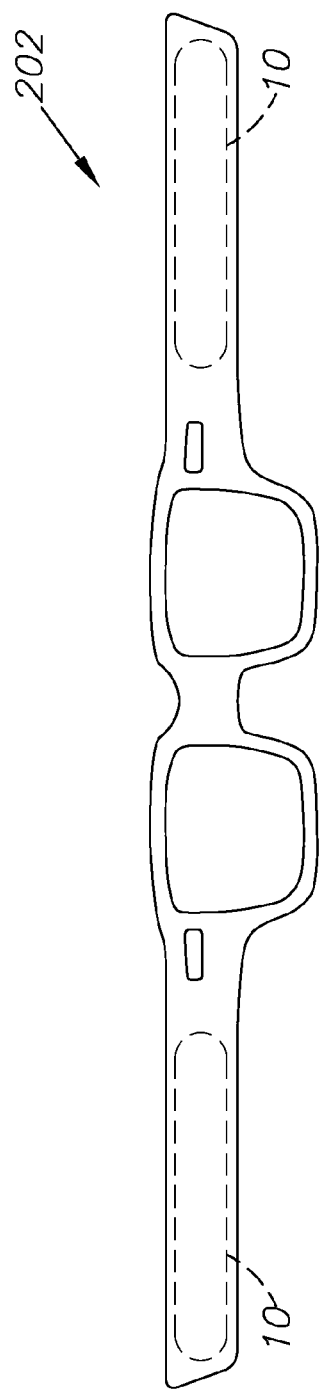

FIG. 17 is a front elevational view of a fifth embodiment of the present invention in an unwrapped position, the embodiment including women's fashion glasses design.

Figure 18:
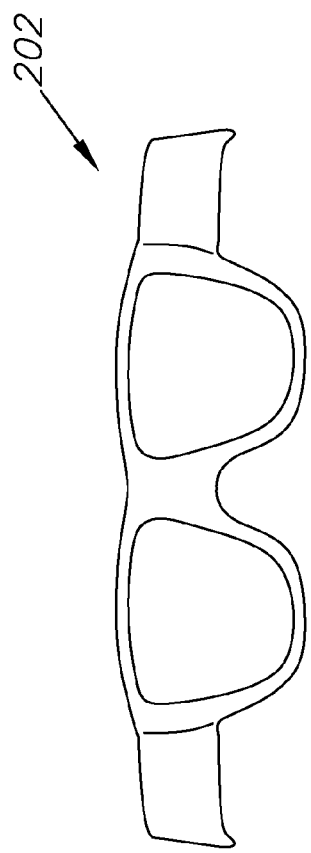

FIG. 18 is a front elevational view thereof in a wrapped position.

Figure 19:
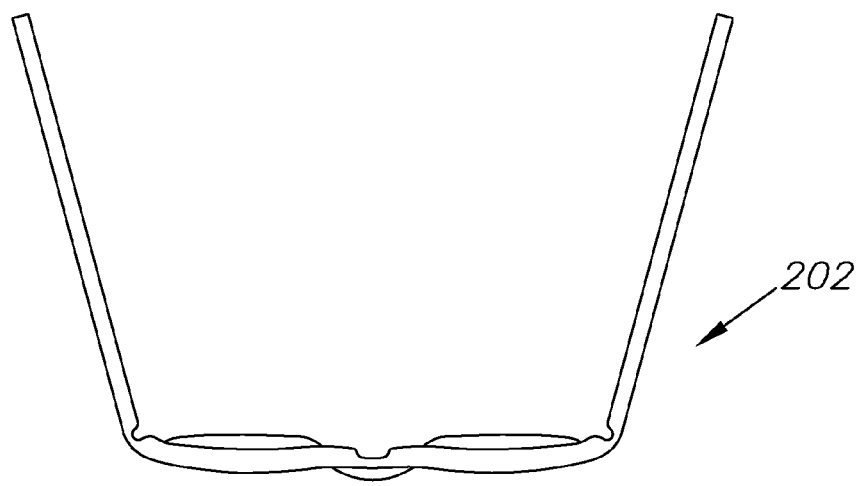

FIG. 19 is a top plan view thereof.

Figure 20:
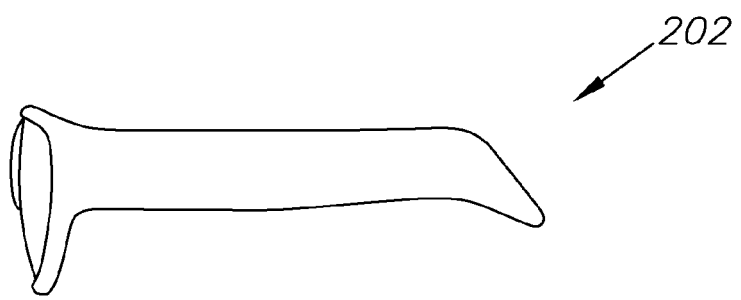

FIG. 20 is a side elevational view thereof.

Figure 21:
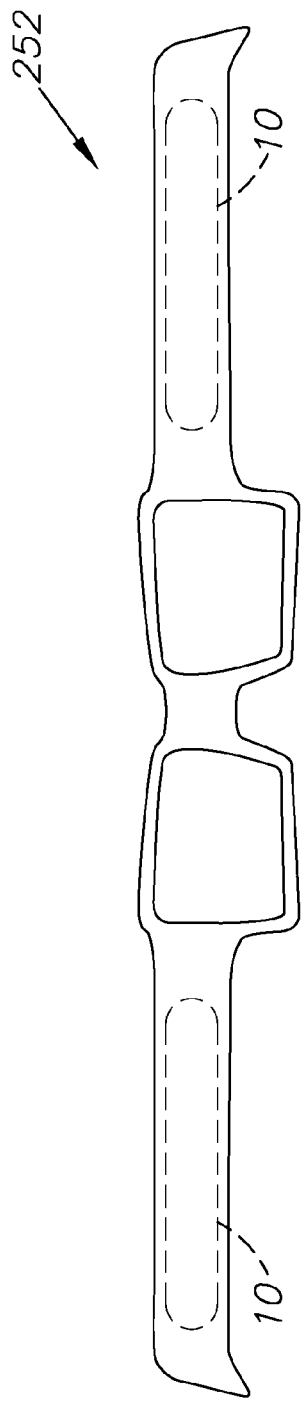

FIG. 21 is a front elevational view of a sixth embodiment of the present invention in an unwrapped position, the embodiment including women's reading glasses design.

Figure 22:
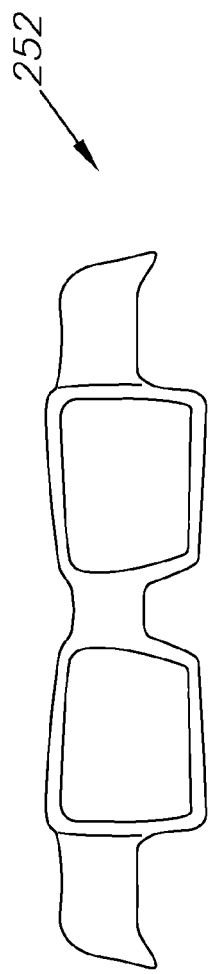

FIG. 22 is a front elevational view thereof in a wrapped position.

Figure 23:
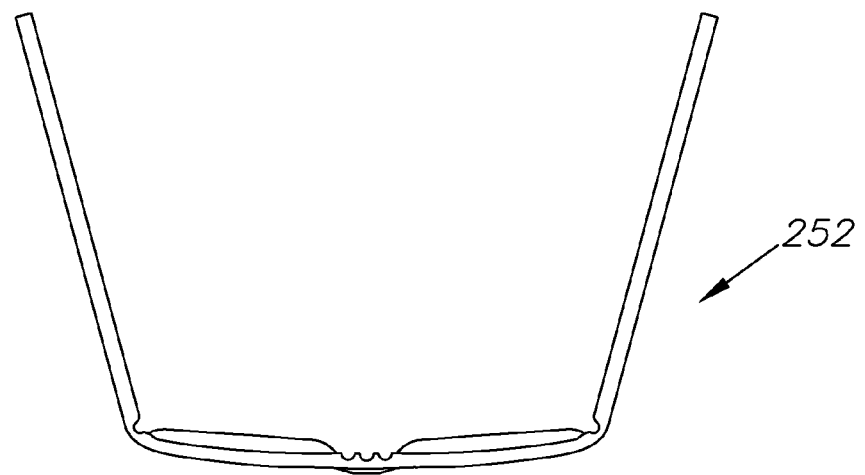

FIG. 23 is a top plan view thereof.

Figure 24:
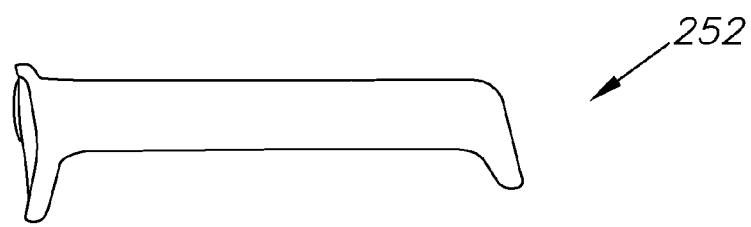

FIG. 24 is a side elevational view thereof.

FIG. 25 is a front elevational view of a seventh embodiment of the present invention in an unwrapped position, the embodiment including women's sunglasses design.

FIG. 26 is a front elevational view thereof in a wrapped position.

Figure 27:
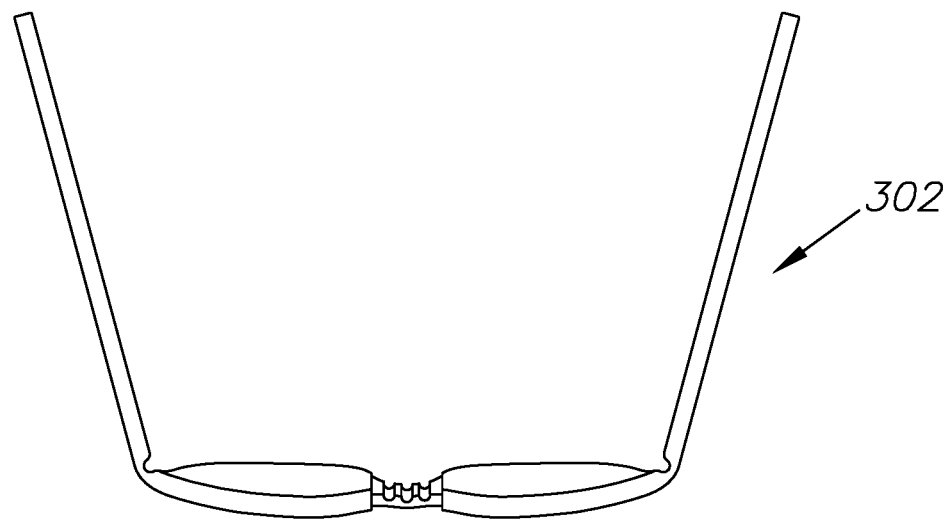

FIG. 27 is a top plan view thereof.

Figure 28:
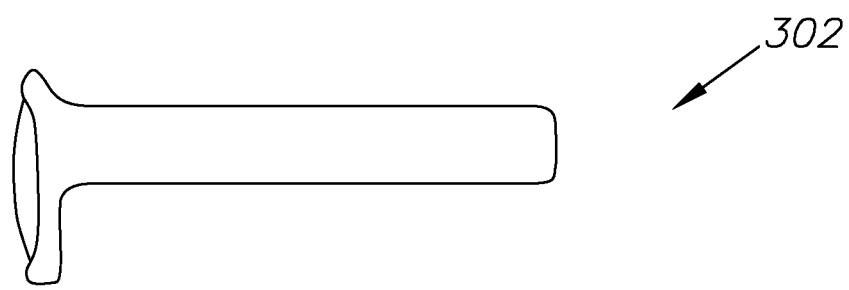

FIG. 28 is a side elevational view thereof.

FIG. 29 is a front elevational view of an eighth embodiment of the present invention in an unwrapped position, the embodiment including children's fashion glasses design.

FIG. 30 is a front elevational view thereof in a wrapped position.

Figure 31:
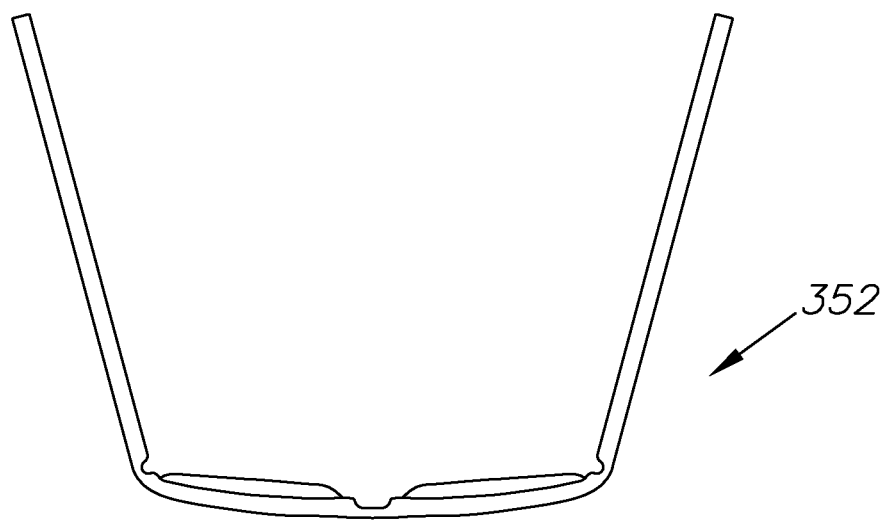

FIG. 31 is a top plan view thereof.

Figure 32:

FIG. 32 is a side elevational view thereof.

Figure 33:
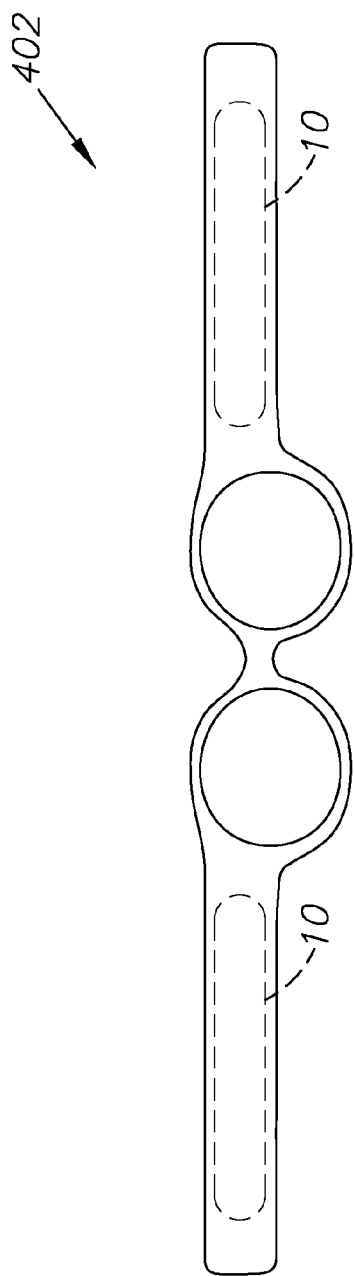

FIG. 33 is a front elevational view of a ninth embodiment of the present invention in an unwrapped position, the embodiment including children's reading or sunglasses design.

Figure 34:
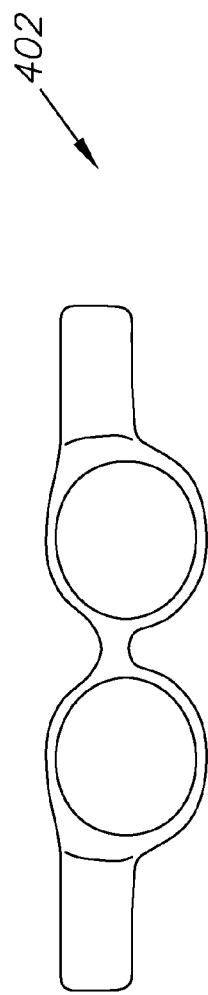

FIG. 34 is a front elevational view thereof in a wrapped position.

Figure 35:
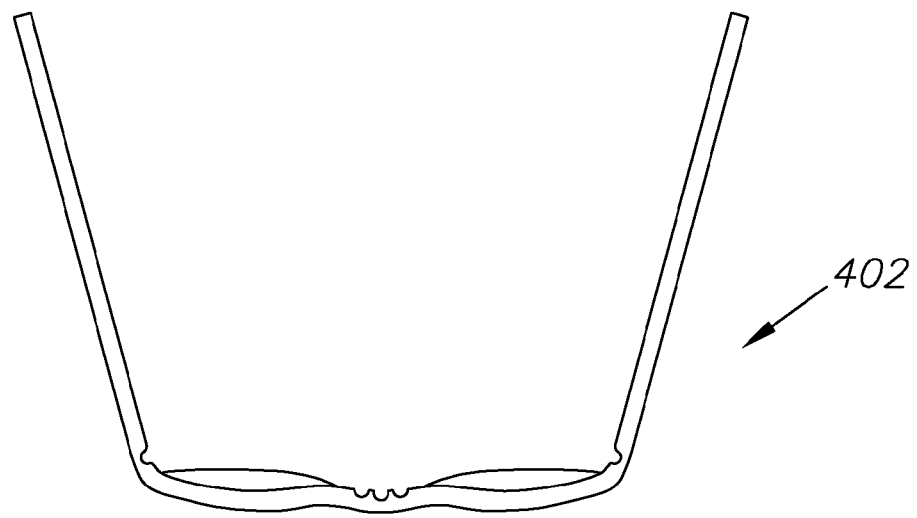

FIG. 35 is a top plan view thereof.

Figure 36:
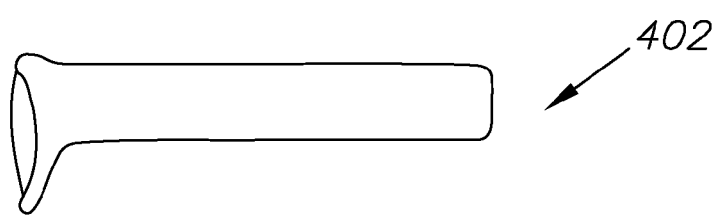

FIG. 36 is a side elevational view thereof.

Figure 37:
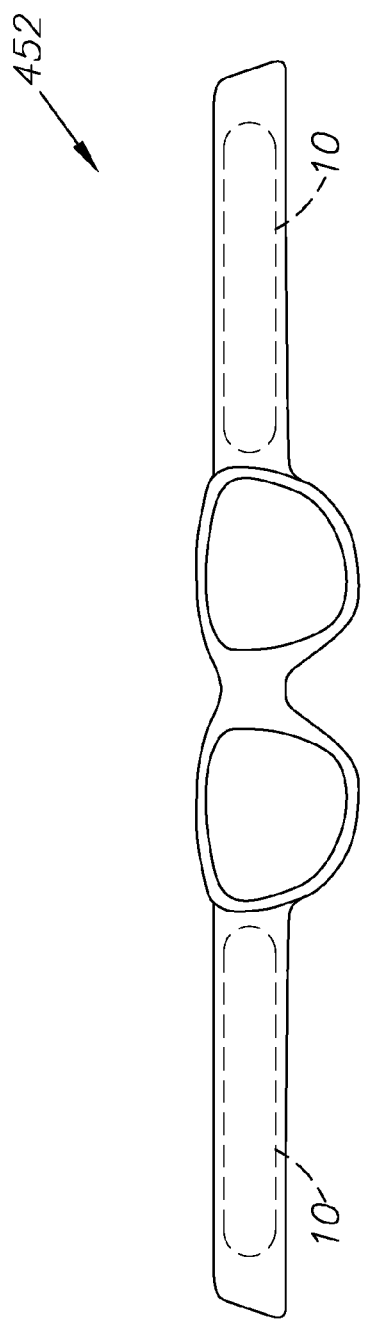

FIG. 37 is a front elevational view of a tenth embodiment of the present invention in an unwrapped position, the embodiment including children's sunglasses design.

Figure 38:
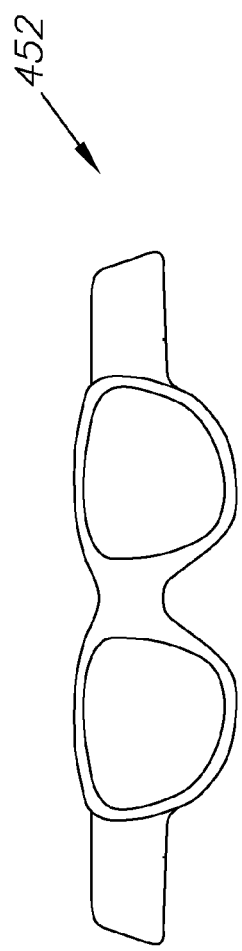

FIG. 38 is a front elevational view thereof in a wrapped position.

Figure 39:
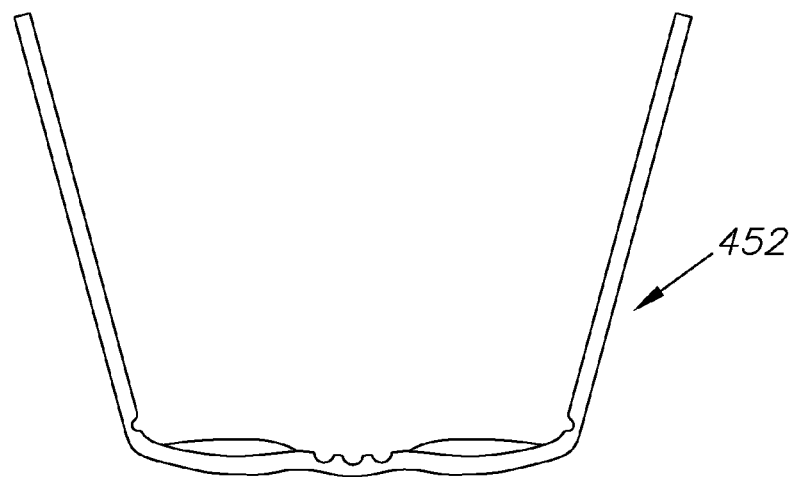

FIG. 39 is a top plan view thereof.

Figure 40:
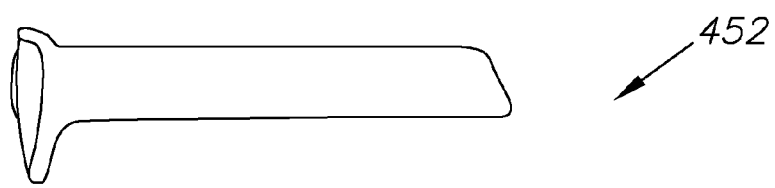

FIG. 40 is a side elevational view thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. First Embodiment Glasses 2

FIGS. 1-4 show a first embodiment of wrap-around glasses 2 including a front frame 4 having a nose piece 12, lenses 6, and wrap-around temples 8 which each temple 8 internally contains a snap steel band 10. These snap steel bands 10 have a slight curve, such that when the temples 8 are straightened, the bands maintain a flat, rigid form easy for storage of the glasses 2. When pressed gently against the sides of a user's head, the snap steel bands 10 deform, forcing the temples 8 to wrap around the user's head, contouring to the shape of the head and securing the glasses in place. The entire assembly of the frame 4 and temples 8 would be constructed from a single piece of material. Optionally, the nose piece 12 would also be manufactured from the same material piece. As shown in embodiments below, the temples 8 may include other features, such as rounded ends for fitting behind ears. FIGS. 1-4 show how these elements would be used in conjunction with sport/utility/safety glasses.

The nose piece 12 may include a flexible bridge for wrapping about the nose of the wearer. The snap steel bands 10 within the temples are made of spring steel. A living hinge is located within the temples 8 between the snap steel 10 bands and the frame element 4, where the frame 4, temples 8, and the living hinge are all made of the same material. The lenses 6 are bonded within the frame 4 and provide reinforcement for the frame due to their rigidity.

III. Second Embodiment Glasses 52

FIGS. 5-8 show a second embodiment of wrap-around glasses including the common features of the first embodiment glasses 2 above. These glasses 52 also include snap steel bands within the temples of the glasses. FIGS. 5-8 show how these elements would be used in conjunction with men's fashion glasses.

IV. Third Embodiment Glasses 102

FIGS. 9-12 show a third embodiment of wrap-around glasses including the common features of the first embodiment glasses 2 above. These glasses 102 also include snap steel bands within the temples of the glasses. FIGS. 9-12 show how these elements would be used in conjunction with men's reading glasses.

V. Fourth Embodiment Glasses 152

FIGS. 13-16 show a fourth embodiment of wrap-around glasses including the common features of the first embodiment glasses 2 above. These glasses 152 also include snap steel bands within the temples of the glasses. FIGS. 13-16 show how these elements would be used in conjunction with unisex sunglasses.

VI. Fifth Embodiment Glasses 202

FIGS. 17-20 show a fifth embodiment of wrap-around glasses including the common features of the first embodiment glasses 2 above. These glasses 202 also include snap steel bands within the temples of the glasses. FIGS. 17-20 show how these elements would be used in conjunction with women's fashion glasses.

VII. Sixth Embodiment Glasses 252

FIGS. 21-24 show a sixth embodiment of wrap-around glasses including the common features of the first embodiment glasses 2 above. These glasses 252 also include snap steel bands within the temples of the glasses. FIGS. 21-24 show how these elements would be used in conjunction with women's reading glasses.

VIII. Seventh Embodiment Glasses 302

FIGS. 25-28 show a seventh embodiment of wrap-around glasses including the common features of the first embodiment glasses 2 above. These glasses 302 also include snap steel bands within the temples of the glasses. FIGS. 25-28 show how these elements would be used in conjunction with women's sunglasses.

IX. Eighth Embodiment Glasses 352

FIGS. 29-32 show an eighth embodiment of wrap-around glasses including the common features of the first embodiment glasses 2 above. These glasses 352 also include snap steel bands within the temples of the glasses. FIGS. 29-32 show how these elements would be used in conjunction with children's fashion glasses.

X. Ninth Embodiment Glasses 402

FIGS. 33-36 show a ninth embodiment of wrap-around glasses including the common features of the first embodiment glasses 2 above. These glasses 252 also include snap steel bands within the temples of the glasses. FIGS. 33-36 show how these elements would be used in conjunction with children's reading and/or sunglasses.

XI. Tenth Embodiment Glasses 452

FIGS. 37-40 show a tenth embodiment of wrap-around glasses including the common features of the first embodiment glasses 2 above. These glasses 452 also include snap steel bands within the temples of the glasses. FIGS. 37-40 show how these elements would be used in conjunction with children's sunglasses.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A pair of wearable glasses comprising:
  a frame containing a pair of lenses and a nose piece;
  a pair of temples branching off of said frame, each respective one of said pair of temples containing a respective one snap steel band internally;
  said snap steel band configured to transform from a first, rigid position to a second, wrapped position; and
  each said respective one snap steel band configured to transform each respective one of said pair of temples from a first, rigid position to a second, wrapped position whereby said wrapped position is configured to wrap about a surface, thereby securing said wearable glasses to said surface.

2. The glasses of claim 1, further comprising:
  each respective one of said pair of temples terminating at a rounded grip configured for at least partially wrapping about an object, thereby further securing said wearable glasses to said surface.

3. The glasses of claim 1, further comprising:
  said frame and said temples being comprised from a single piece of material;
  said lenses configured to provide structural reinforcement for the frame; and a respective living hinge existing between each respective temple and said frame, said living hinges allowing said temples to bend about said frame.

4. The glasses of claim 1, wherein said snap steel band comprises spring steel.

5. The glasses of claim 1, wherein said nose piece comprises a flexible bridge configured to wrap about a second surface.

6. A pair of wearable glasses comprising:
- a frame containing a pair of lenses and a nose piece, said lenses configured to provide structural reinforcement for the frame;
- a pair of temples branching off of said frame, each respective one of said pair of temples containing a respective one snap steel band internally, wherein said pair of temples and said frame are comprised from a single piece of material, and wherein a respective living hinge is created between each respective one of said pair of temples and said frame;
- said snap steel band configured to transform from a first, rigid position to a second, wrapped position; and
- each said respective one snap steel band configured to transform each respective one of said pair of temples from a first, rigid position to a second, wrapped position whereby said wrapped position is configured to wrap about a surface, thereby securing said wearable glasses to said surface.

* * * * *